June 16, 1953 R. B. WALDER 2,641,936
AUTOMATIC TRANSMISSION
Filed Oct. 16, 1948
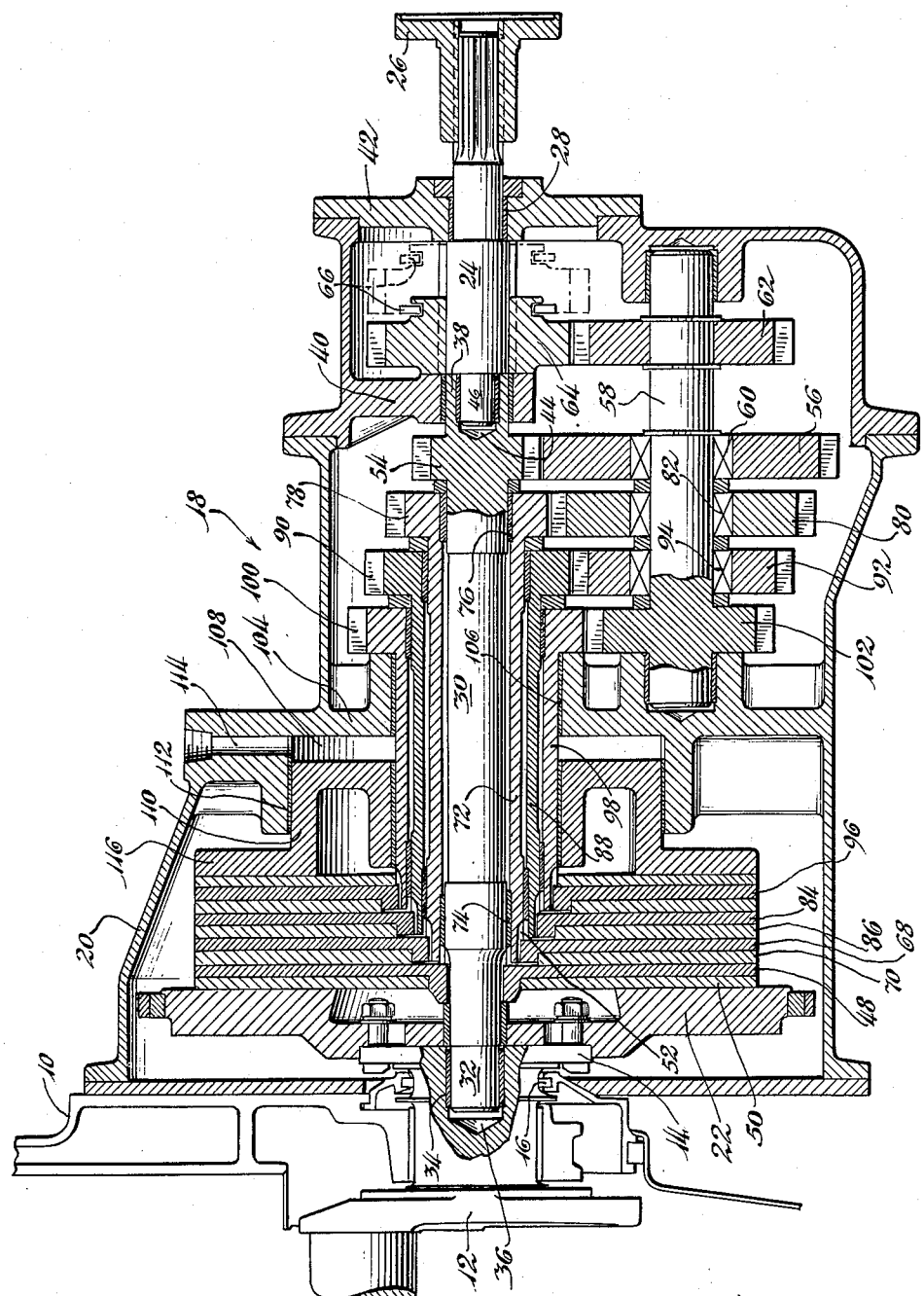
Inventor:
Robert B. Walder
By Hinkle, Horton, Ahlberg, Hansmann & Wupper
Attorneys.

Patented June 16, 1953

2,641,936

UNITED STATES PATENT OFFICE 2,641,936

AUTOMATIC TRANSMISSION

Robert B. Walder, Detroit, Mich.

Application October 16, 1948, Serial No. 54,984

5 Claims. (Cl. 74—330)

The present invention relates to power transmission apparatus and more particularly is concerned with an automatic transmission of the type used on automotive vehicles between the engine and the final drive.

One of the objects of the present invention is to provide a novel fully automatic transmission which is extremely simple in construction and yet accomplishes all of the required functions at high efficiency.

Still another object is to provide an automatic transmission which is so constructed that the ratio of the drive is dependent upon the torque required as modified by the hydraulic pressure in a single pressure cylinder.

Yet another object is to provide a novel transmission of the automatic type so arranged that full control over the transmission in all forward speeds will be exercised by simply changing the hydraulic pressure in a single piston cylinder combination.

Yet another object is to provide a multiple speed transmission in which the transition between the various speeds takes place gradually under load without requiring any torque reversal.

Still another object is to provide a novel transmission having a plurality of speed ratios and so arranged that power is transmitted to the output shaft through all of the ratios when the transmission is operating in the lowest speed range.

Yet another object is to provide a novel clutch for use in a transmission of the above type which has individual elements for transmitting power for each of the individual ratios and so arranged that a single pressure element will engage all of the clutch elements in such manner as to give a final drive of the proper ratio.

Other objects and advantages will become apparent from the following description of a preferred embodiment of my invention.

In the single figure of the drawing I have illustrated an automobile transmission in diagrammatic form and have omitted from the drawing the control apparatus for the transmission since such control apparatus is well known. Although it may take several forms, it is sufficient to point out here that the control apparatus for the specific transmission shown is of the hydraulic type which supplies oil under pressure to the transmission and is so arranged that the pressure of the oil so supplied is a function of the speed and load conditions prevailing under the particular driving circumstances. Normally, such apparatus will obtain the speed controlled characteristic by use of a device which rotates with the engine while the load controlled characteristic will be obtained from apparatus which is sensitive to the engine manifold pressure. Supplementary apparatus connected to be driven by the wheels, usually the rear wheels of the vehicle, and to be speed responsive should also be used for control purposes so as to enable the transmission to be engaged when the vehicle is being pushed or rolled down hill for the purpose of starting the engine. The control apparatus to be used with the present invention should be of the type in which the pressure of the oil supplied to the clutch element is varied with engine speed and with various power requirements.

Referring to the drawing in which the transmission is diagrammatically indicated, the vehicle engine is indicated by the numeral 10 and has a crankshaft 12, the output end flange 14 of which extends in conventional manner to the outside through an oil seal 16. The transmission, indicated generally by the numeral 18, has a bell portion 20 at its forward end which is secured to the engine. The engine flange 14 extends into the forward end of the bell housing and is bolted to a clutch driving plate 22 so that this driving plate which also serves as the flywheel of the engine rotates at engine speed, all of the drive being taken from this plate.

At the opposite end of the transmission a main drive shaft 24 having a driving flange 26 splined thereto extends into the transmission and is journaled in a bearing 28. This main drive shaft is in axial alignment with the engine flange 14.

A low speed pinion shaft 30 is journaled at its forward end 32 in a bearing 34 fitted into a socket 36 formed in the end of the engine crankshaft 12 in the center of the flange 14. The opposite end 38 of the low speed pinion shaft is journaled in a bracket or hanger 40 formed in the transmission case at a point a short distance ahead of the transmission case rear wall 42. This rearward end 38 of the low speed pinion is also provided with a socket 44 containing a bearing ring or sleeve which journals the forward end 46 of the main drive shaft 24. The result of this arrangement is that the end of the engine shaft, the low speed pinion shaft 30 and the main drive shaft 24 are all in axial alignment and free to rotate relative to each other.

Near its forward end at a position just to the rear of the clutch driving disk 22 the low speed pinion shaft 30 is splined to a clutch driven plate 48 having a clutch facing 50 such that movement of the plate 48 to the left as seen in the drawing will bring the facing 50 against the clutch face of the driving disk or flywheel 22. As is customary, the splines, indicated by the numeral 52, permit free movement of the clutch plate 48 backwardly and forwardly a short distance but prevent any relative rotation between the driven plate 48 and the shaft 30. Near its opposite end just ahead of the bearing hanger 40 the low speed pinion shaft 30 is provided with a low speed pinion preferably formed integral therewith and indicated by the numeral 54. This low speed pinion 54 is meshed with a low speed gear 56 carried upon a countershaft 58 journaled in the transmission case at its two ends in a position parallel to and below the low speed pinion shaft 30. The low speed gear 56 is connected to the countershaft 58 by an overrunning clutch 60 which causes the countershaft 58 to be driven by the gear 56 when the engine is running in a forward direction but permits the gear 56 to idle upon the shaft 58 if the shaft 58 has a tendency to run in the same direction at a higher speed.

The countershaft 58 carries a main drive pinion 62 in a position in alignment with the portion of the main drive shaft just rearwardly of the bearing hanger. This main drive pinion is meshed with the main drive gear 64 splined to the main drive shaft 24 such that power is transmitted from the countershaft to the main drive shaft when the main drive gear and pinion are in mesh. The main drive gear, however, is shiftable rearwardly upon its splines into engagement with a pinion upon a reverse countershaft which in turn is geared to the main drive pinion when it is desired to operate the automobile in reverse. This reverse countershaft and the gear and pinion thereon are not shown since such elements are well understood and their showing would not contribute to a clear understanding of the present invention. The shift of the main drive gear to the forward or the reverse position is accomplished by a conventional shifting fork 66 which is under the control of the driver. Normally, this control need provide simply a forward, a neutral and a reverse position, the forward and reverse positions determining the position of the fork 66 while the neutral position operates the control apparatus which supplies oil under pressure to the transmission.

The rearward face of the clutch driven plate 48 acts as a clutch driving surface for a second speed clutch plate, indicated by the numeral 68. This driven plate 68 carries a facing 70 and is generally similar to the plate and facing 48 and 50. It is splined at its center to a quill shaft 62 so that it is free to move back and forth a slight distance so as to be brought into or out of engagement with the low speed clutch plate 48. The quill shaft 72 which also serves as the second speed pinion shaft is journaled at its forward and rearward ends, indicated respectively by the numerals 74 and 76, to the low speed shaft 30. The second speed shaft, therefore, is free to rotate relative to the low speed shaft 30. At its rearward end the second speed quill shaft carries the second speed pinion 78 somewhat larger in diameter than the low speed pinion 54 which is meshed with the second speed gear 80 carried by the countershaft 58, this second speed gear like the low speed gear being connected to the countershaft 58 by an overrunning clutch 82.

Rearwardly of the second speed driving clutch disk 68 there is arranged a third speed clutch disk 84 having a facing 86 adapted to be brought against the rearward face of the second speed clutch disk 68 and this third speed clutch disk 84 is similarly splined at its center to a third speed quill shaft 88 journaled at its ends to the second speed shaft 72. The rearward end of this third speed quill shaft carries a third speed pinion 90 which is meshed with a third speed gear 92 connected to the countershaft 58 by a third overrunning clutch 94.

Similarly, in the transmission shown, there is a fourth speed clutch disk and facing, indicated by the numeral 96, disposed in a position behind the third speed clutch disk 84 and adapted to be brought into engagement therewith. This fourth speed clutch disk also is splined at its center to a quill shaft 98 which is journaled to the third speed quill shaft near its ends. At its rearward end this fourth speed quill shaft carries a fourth speed gear 100 which is meshed with a fourth speed pinion 102 upon the countershaft 58. Unlike the other gears upon the countershaft the fourth speed pinion 102 is connected directly to the shaft or formed integrally therewith so that the drive is not through an overrunning clutch. In the transmission shown, inasmuch as the gear 100 is larger than the pinion 102 these gears serve to provide an overdrive ratio such that the output shaft of the transmission can rotate at a higher speed than the engine crank shaft.

The transmission casing has a wall 104 which divides the transmission into a forward compartment and a rearward compartment. The rearward compartment contains all of the gears and pinions mentioned and the wall itself serves to provide a bearing surface and oil seal 106 where the overdrive quill shaft 98 extends therethrough. The forward side of the partition or wall 104 is formed to provide a cylinder 108 fitted to a piston 110. The inner surface of the cylinder preferably is lined with bearing material, as indicated at 112, so that the piston 110 is free to slide relative to the cylinder and is also free to rotate relative thereto. At its center this piston is journaled to the fourth speed countershaft 98 so that relative rotation between these elements is also possible. A passage 114 extends from the cylinder 108 to the outside so that oil under pressure can be supplied by the control apparatus previously mentioned to the cylinder 108.

The piston 110 beyond the end of the cylinder 108 extends outwardly to form a flange 116 having an external diameter approximately the same as that of the fourth speed clutch plate 96 so that when the piston 110 is moved forwardly it applies an even pressure over the major portion of the area of the back surface of the fourth speed clutch plate. It will be noted that although the clutch has several driven plates, one for each of the ratios, there is only one actuating member, that is, the piston 110, for this entire group.

The device operates in the following manner. Assuming that the main drive gear 64 is meshed with the main drive pinion 62 and that the piston 110 is retracted because of low pressure in the cylinder 108 and that the engine is operating so that the crankshaft is rotating, it will be seen that only the driving disk or flywheel 22 rotates with the engine. This is because there is no engagement between the clutch plate 48 and the driving plate 22. If, now, the engine is accelerated so as to cause the control mechanism to supply oil under a higher pressure to the cylinder 108, it will be seen that the piston 110 moves forwardly. This applies a gradual pressure against the back face of the fourth speed clutch disk 96 and urges this disk forwardly against the third speed disk and so on so that this gradual pressure tends to compact the entire clutch assembly evenly. The ultimate result is that the low speed driven disk 48 is brought into engagement with the driving plate 22 so that although there is a relative slip between these elements, torque is applied from the flywheel 22 to the disk 48. Simultaneously, torque will also be applied from the low speed disk 48 to the second speed disk 68 and so on. Thus all of the pinions 54, 78 and 90 and the gear 100 tend to rotate their respective gears 56, 80 and 92 and the gear 102. The result is that the countershaft 58 begins to turn and by way of the main drive pinion 62 and the main drive pinion 64 causes rotation of the output shaft 24. Inasmuch as the leverage between the low speed pinion 54 and the low speed gear 56 is much greater than that between any of the other pinions and gears it will be appreciated that the major portion of the torque applied to the countershaft will be by way of the low speed pinion and gear combination. As the car is gradually brought up to speed so that the low speed clutch plate 48 approaches the speed of the flywheel 22 there will be less and less slip between these elements. The ratio of slip between the successive clutch plates will remain the same, however, because the degree of this relative movement is determined by the several gear sets. Eventually the automobile will be brought up to such a speed that the low speed clutch 48 locks in with the flywheel 22 and rotates at the same speed. A slight increase in the speed of the output shaft beyond this point will cause the low speed gear to overrun upon the countershaft 58 because of the overrunning clutch 60.

The drive now continues by way of the flywheel 22 and the several clutch elements in tandem associated therewith excepting that the low speed pinion shaft 30 does not now carry any of the torque, although, of course, all of the power is transmitted by way of the low speed clutch plate 48. As the speed of the vehicle relative to the engine still further increases so that the relative slip between the second speed clutch 68 and the low speed clutch 48 decreases, power will continue to be applied to the countershaft 58 by way of the pinions 78 and 90 and the gear 100 which drive, in order, the gears 80 and 92 and the pinion 102. The major portion of the power, however, will be transmitted by way of the second speed pinion and the second speed gear since the greater torque multiplication takes place between these two elements.

Eventually when the second speed clutch disk locks in with the low speed clutch disk and the speed increases slightly thereabove the second speed gear 90 will overrun the shaft 58 so that all of the power is transmitted by way of the third speed pinion 90 and gear 92 and the high speed gear 100 and pinion 102, the major portion of the torque being transmitted by way of the third speed pinion and gear.

As a sufficiently higher car speed relative to engine speed the third speed clutch will closely approach the speed of rotation of the second speed clutch until eventually these two elements lock in and at any speed thereabove the third speed gear 92 will overrun the countershaft, thereby transferring all of the drive to the fourth speed clutch 96, gear 100 and pinion 102. The fourth speed clutch soon comes up to the speed of rotation of the third speed clutch and locks so that eventually the entire composite clutch consisting of the flywheel 22, the low speed plate 48, the second speed plate, the third speed plate 84 and the fourth speed plate 96 rotate solidly together. At this point the transmission is in its highest gear ratio with all of the torque being transmitted through the overdrive gear and pinion 100 and 102 to the countershaft 58 and by way of the main drive pinion 82 and main drive gear 64 to the output shaft 24.

If at any time load conditions should become such as to cause the clutch to slip, slippage will first take place at the point where there is the least torque multiplication or, in other words, between the fourth speed clutch plate and the third speed plate. The result is that any driving conditions which produce a higher loading condition than the engine can advantageously handle will cause the transmission automatically to move downwardly into lower speed ratios so as to give some torque multiplication between the engine and the final drive. This action can, of course, be aided by the control mechanism which can be designed to vary the oil pressure in the cylinder 108 on any desired basis so as to give whatever transmission action is most appropriate to the particular engine and vehicle combination.

From the above it will be seen that the automatic transmission shown supplies four forward speeds, although more or less of course can be used if desired, and that these four speed ratios are accomplished in an extremely simple manner by the simple use of four independent sets of gear ratios which are integrated together by a composite clutch which smoothly transfers the drive through the various ratios depending upon the speed and load conditions which prevail at any particular moment. It should be appreciated also that in any particular ratio, torque is transferred to the output shaft principally through the lowest ratio which is usable at that speed but that a portion of the torque is also transferred at the same time through all of the higher ratios. Further is it apparent that although when the vehicle is operating at low speed the amount of slip of the highest speed clutch disk relative to the flywheel is great, its slip relative to the next lower speed ratio clutch with which it is in actual engagement is not nearly so great and is always determined and limited by the ratio of the high speed gear relative to the next lower speed gear. It is worthy of note that the conditions governing the design of the clutch elements are such that the individual clutches do not have to meet conditions at one speed or ratio which are different than those at other speeds or ratios. As an example, in considering the clutch at the lowest speed ratio, it will be seen that regardless of the speed ratio in which the transmission is operating all of the power from the engine will be transmitted between the flywheel 22 and the low speed clutch plate 48 even though the vehicle may be operating in its highest gear ratio. This is because in spite of the fact that no power is being transmitted through the low speed pinion shaft 30, power nevertheless passes through the low speed clutch plate 48 to the next higher speed clutch plate 68 and so on.

Having described my invention, what I claim as new and useful and desire to secure by Letters Patent of the United States is:

1. In an automatic power transmission a driving member, a first driven member having a forward face adapted to be brought gradually into engagement with said driving member so as to be driven thereby, a second driven member having a forward face adapted to be brought gradually into engagement with the rearward face of said first driven member so as to be driven thereby, a third driven member having a forward face adapted to be brought into engagement with the rearward face of said second driven member so as to be driven thereby, actuating means for applying a pressure which is variable for urging said third driven member toward said driving member to cause gradual simultaneous engagement of all of said members, a driven shaft, means forming a low speed driving connection between said first driven member and said driven shaft, means forming a higher speed driving connection between said second driven member and said driven shaft, means forming a still higher speed driving connection between said third driven member and said driven shaft, and overrunning clutch means being incorporated in each of said low speed and said higher speed driving connections.

2. In an automatic transmission of the type described, a composite clutch comprising a driving member, a plurality of driven members arranged in tandem relationship with the first of said driven members in co-operative relationship to said driving member and each of the additional members being in co-operating relationship with the next adjacent preceding member, said members adapted when in one position to be rotatable independently of each other, and a single means for compacting all of said members simultaneously under a variable pressure so as to cause each of said members to be in torque transmitting relationship to the next preceding member, individual power transmitting means connected to each of said clutch driven members for transferring power from each of said members to a common shaft at different rates of torque multiplication, and said transmitting means connection to the first of said members producing the highest degree of torque multiplication and each of the other of said power transmitting means producing successively less torque multiplication as said driven members are spaced from said driving member.

3. In a transmission of the type described, a clutch having a multiple disk assembly, one of said disks comprising a driving member, and the others of said disks forming a plurality of driven members in tandem, pressure producing means adapted to squeeze said driving and all of said driven disks into simultaneous frictional contact, and auxiliary gear means connected between said driven disks for insuring fixed relative rotation between all of said driven disks until at least one of said driven disks is rotating at the same speed as said driving disk.

4. The combination called for in claim 3 in which the last said means comprises a plurality of coaxial shafts connected individually to said driven disks, a countershaft located adjacent said coaxial shafts and different ratio gear means connecting each of said concentric shafts to said countershaft, and all but one of said gear means including one-way torque transmitting elements, said elements comprising overrunning clutches adapted to overrun whenever the speed of said countershaft relative to said individual concentric shafts is higher than the ratio of the respective individual gear means connecting said countershaft to said individual concentric shafts.

5. In an automatic transmission of the type described, a composite clutch comprising a driving element, a plurality of driven members arranged in tandem relationship with the first of said driven members in co-operative relationship to said driving element and each of the additional members being in co-operating relationship with the next adjacent preceding member, said members adapted when in one position to be rotatable independently of each other, and a single means for compacting said element and all of said members simultaneously under a variable pressure so as to cause each of said members to be in torque transmitting relationship to the next preceding member, individual power transmitting means connected to each of said clutch driven members for transferring power from each of said members to a common shaft at different gear ratios to obtain different rates of torque multiplication, said transmitting means connected to the first of said members having the highest gear ratio for producing the highest degress of torque multiplication and each of the other of said power transmitting means having successively lower gear ratios for producing successively less torque multiplication as said driven members are spaced from said driving element, and said single means including a cylinder coaxial with said driven members, said cylinder having an open end facing said driven members, piston means disposed in said cylinder and adapted to rotate and slide therein, said piston having one of its ends in contact with the last of said driven members, and means for producing a pressure in said cylinder for moving said piston to compact all of said members simultaneously while rotating with the last of said driven members.

ROBERT B. WALDER.

References Cited in the file of this patent

UNITED STATES PATENTS

| Number | Name | Date |
|---|---|---|
| 799,088 | Prentice | Sept. 12, 1905 |
| 1,118,384 | Thomson | Nov. 24, 1914 |
| 1,589,267 | Toomey | June 15, 1926 |
| 1,611,545 | Maybach | Dec. 21, 1926 |
| 1,778,365 | Littlejohn | Oct. 14, 1930 |
| 2,019,146 | Livermore | Oct. 29, 1935 |
| 2,043,239 | Curtis | June 9, 1936 |
| 2,055,895 | Fawcett | Sept. 29, 1936 |
| 2,094,449 | Forichon | Sept. 28, 1937 |
| 2,307,797 | Kohl | Jan. 12, 1943 |
| 2,321,226 | McKay | June 8, 1943 |
| 2,427,432 | Wilhelmy | Sept. 16, 1947 |
| 2,430,799 | Aspinwall | Nov. 11, 1947 |